US007705293B2

(12) United States Patent
Miyahara et al.

(10) Patent No.: US 7,705,293 B2
(45) Date of Patent: Apr. 27, 2010

(54) SENSOR AND RECORDING APPARATUS USING THE SAME

(75) Inventors: Katsutoshi Miyahara, Kawasaki (JP); Takashi Kawabata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 11/466,178

(22) Filed: Aug. 22, 2006

(65) Prior Publication Data

US 2007/0046713 A1 Mar. 1, 2007

(30) Foreign Application Priority Data

Aug. 31, 2005 (JP) ............................ 2005-251651
Aug. 2, 2006 (JP) ............................ 2006-211053

(51) Int. Cl.
*H01J 5/02* (2006.01)
*G01N 21/86* (2006.01)

(52) U.S. Cl. .................................... 250/239; 250/559.4

(58) Field of Classification Search ................. 250/200, 250/559.11, 559.16, 559.18, 559.4, 216, 250/239, 548, 221; 347/16, 14, 106
See application file for complete search history.

(56) References Cited

U.S. PATENT DOCUMENTS

| | | | | |
|---|---|---|---|---|
| 3,667,846 | A * | 6/1972 | Nater et al. | 356/623 |
| 4,168,437 | A * | 9/1979 | Nihonmatsu | 250/559.2 |
| 4,763,006 | A * | 8/1988 | Rau et al. | 250/559.46 |
| 4,960,996 | A | 10/1990 | Hochstein | |
| 5,144,132 | A | 9/1992 | Kitakado | |
| 5,408,090 | A * | 4/1995 | Craddock | 250/222.1 |
| 5,764,251 | A * | 6/1998 | Hashimoto | 347/16 |
| 6,386,669 | B1 * | 5/2002 | Scofield et al. | 347/14 |
| 6,433,350 | B2 * | 8/2002 | Hwang et al. | 250/559.11 |
| 6,600,167 | B2 * | 7/2003 | Sano | 250/559.11 |
| 2003/0137679 | A1 | 7/2003 | Nakazawa et al. | |
| 2004/0080553 | A1 | 4/2004 | Kim | |
| 2004/0179209 | A1 | 9/2004 | Besch | |

FOREIGN PATENT DOCUMENTS

| | | | |
|---|---|---|---|
| CN | 1529997 | A | 9/2004 |
| EP | 0468371 | A2 | 1/1992 |
| JP | H02-082109 | A | 3/1990 |
| JP | 05-087526 | A | 4/1993 |
| JP | 05-346626 | A | 12/1993 |
| JP | 07-144793 | A | 6/1995 |
| JP | 08-048438 | A | 2/1996 |
| JP | 2003-212390 | A | 7/2003 |

OTHER PUBLICATIONS

"TSL2014 Linear Sensor Array datasheet" Apr. 2004, Texas Advanced Optoelectronic Solutions Inc., Plano, TX, XP002410592.

* cited by examiner

*Primary Examiner*—Georgia Y Epps
*Assistant Examiner*—Jennifer Bennett
(74) *Attorney, Agent, or Firm*—Canon USA INC IP Division

(57) ABSTRACT

At least one exemplary embodiment is directed to a sensor for measuring the distance between the sensor and a measuring surface, which includes a light-emitting element and a plurality of light-receiving elements. The light-receiving elements are arranged so that the light axes thereof do not cross one another.

14 Claims, 12 Drawing Sheets

SENSOR AND RECORDING APPARATUS USING THE SAME

BACKGROUND OF THE INVENTION

1. Field of the Invention

The present invention relates to an optical sensor that detects the amount of displacement of a detecting object on the basis of a reference characteristic of a surface of the detecting object. More particularly though not exclusively, the present invention relates to an optical sensor installed in a recording apparatus to detect the amount of displacement of a detecting object, to detect the color density, and to determine the type of the detecting object.

2. Description of the Related Art

Inkjet recording apparatuses (hereinafter referred to as recording apparatuses) have been equipped with various sensors corresponding to different purposes in order to meet various needs such as higher image quality, higher precision, and higher user friendliness. Examples of sensors used are a sensor for detecting the width (size) of a recording sheet (recording medium) set in a recording apparatus and the end of the recording sheet, a sensor for measuring the density of a patch (pattern) or an image recorded on the recording sheet, a sensor for detecting the thickness and presence of the recording sheet, and a sensor for determining the type of the recording sheet.

These recording apparatuses generally use optical sensors. Optical sensors include a light-emitting element for emitting light, and a light-receiving element for receiving the light from the light-emitting element. The light-receiving element provides an output in accordance with the amount (intensity) of received light. In particular, a transmissive optical sensor and a reflective optical sensor are frequently used.

In general, a reflective sensor is used to detect the thickness of a recording sheet. In the reflective sensor, a light-emitting element applies light onto a surface of a recording sheet serving as a detecting object to be detected, and a light-receiving element receives light reflected by the recording sheet. The distance between the reflective sensor and the surface of the recording sheet can be measured on the basis of the amount of light received by the light-receiving element. For example, when an optical reflective sensor is mounted on a carriage of the recording apparatus, measurement is performed as follows. First, a recording sheet serving as a detecting object to be detected is moved from a recording-sheet storage unit onto a platen, and the distance between the surface of the recording sheet and the reflective sensor mounted on the carriage is measured by the reflective sensor. In this case, since the distance between the reflective sensor and the platen is set at a value specified in design of the recording apparatus, the thickness of the recording sheet can be detected by calculation on the basis of the measured distance and the specified value.

Japanese Patent Laid-Open No. 05-087526 discusses an optical sensor that detects the thickness of a recording sheet. In this optical sensor, an LED or a semiconductor laser is used as a light-emitting element, and a PSD (position sensitive detector) or a CCD is used as a light-receiving element. In this case, light emitted from the light-emitting element is reflected by a detecting object, and a part of the reflected light is received by the light-receiving element. With this configuration, if the distance between the optical sensor and the detecting object changes, the center of reflected light received by the light-receiving element also changes. When the light-receiving element is a CCD, the amount of light in each pixel can be measured. Therefore, the center of reflected light can be found by detecting the pixel in which the largest amount of light is obtained, and the distance between the optical sensor and the detecting object can be calculated by triangulation. When the light-receiving element is a PSD, the center of reflected light is obtained by calculating two values output from the light-receiving element when the center changes, and the distance between the sensor and the detecting object can be calculated from the obtained position by triangulation.

In a general optical sensor for detecting the width of a recording sheet and ends (a leading end and a trailing end) of the recording sheet, a reflective optical system is constituted by one light-emitting element and one light-receiving element, and the ends of the recording sheet are detected on the basis of changes in intensity (amount) of reflected light. It is checked whether a recording sheet is placed within a detection area of the optical sensor, by using the fact that there is a difference in intensity of reflected light received by the light-receiving element when the light-emitting element applies light onto the surface of the recording sheet and when the light-emitting element applies light onto a portion outside the recording sheet, for example, on a platen or a feeding path. In an inkjet recording apparatus, in which a carriage is scanned in a direction different from the feeding direction of the recording sheet, when the reflective sensor is mounted on the carriage, the widthwise end of the recording sheet can also be detected.

A sensor for measuring the color density of a patch printed on a recording sheet includes three light-emitting elements for emitting red, blue, and green light beams and one light-receiving element, or includes a white light source and a light-receiving element having a color filter. Japanese Patent Laid-Open No. 05-346626 discusses a technique of detecting the color density of a color patch with this sensor. In this technique, reflected light from the color patch is received by the light-receiving element, and the amount of attenuation of reflection intensity from the reference reflection intensity is calculated. In an inkjet recording apparatus in which a carriage is scanned in a direction different from the feeding direction of the recording sheet, when the reflective sensor is mounted on the carriage, the density of a patch recorded at a predetermined position on the recording sheet can be detected.

The above-described known optical sensor for detecting the thickness of the recording sheet includes a light-emitting element such as an LED, and a light-receiving element such as a photodiode. While the optical sensor itself is inexpensive, it cannot check whether the detecting object is shifted closer to or away from a predetermined position. In a reflective optical sensor, a light-receiving element is placed at a position such as to receive the largest possible amount of reflected light from a detecting surface on which light is applied by a light-emitting element, (e.g., FIG. 8B). That is, the light axis of reflected from the detecting surface coincides with the center of the light-receiving element. In this case, the distance between the optical sensor and the detecting surface is referred to as a reference distance, and the detecting surface is referred to as a reference surface.

A sheet having a predetermined reflection characteristic can be used as the reference surface which is the reference for calibration of the optical sensor. When the detecting object is shifted from the reference surface toward the optical sensor, that is, the distance between the detecting object and the optical sensor is shorter than the reference distance, as shown in FIG. 8A, the amount of light reflected by the detecting object and received by the light-receiving element is smaller than when the light is reflected by the reference surface. This is because the light axis of reflected light from the detecting surface does not coincide with the center of the light-receiving element, and a region on the detecting surface in which light is applied from the light-emitting element is not aligned with a light-receiving region of the light-receiving element on the detecting surface. When the detecting object is shifted from the reference surface away from the optical sensor, as shown in FIG. 8C, similarly, the amount of light received by the light-receiving element is reduced.

In FIGS. 8A to 8C, reference numerals 801$a$-$c$, and 802$a$-$c$ denote a light-emitting region of the infrared LED 201, and a light-receiving region of the phototransistor 203. In the above described situation related to what is illustrated in FIG. 8A, the light emitting region 801$a$ and the light receiving region 802$a$ overlapped partially, with a similar amount of overlap for the situation illustrated in FIG. 8C (regions 801$c$ and 802$c$). In the situation of FIG. 8B, the light emitting region 801$b$ lies completely in the light receiving region 802$b$.

FIG. 9 is a graph showing changes in the output from the light-receiving element caused when the distance between the optical sensor and the detecting object changes. As shown in FIG. 9, it is difficult for the inexpensive reflective sensor to check whether the detecting object is shifted from the reference surface toward the optical sensor or away from the optical sensor.

In the above-described optical sensor discussed in Japanese Patent Laid-Open No. 05-087526, a PSD or a CCD is used as the light-receiving element. In this case, the distance between the optical sensor and the detecting object can be detected. However, the size of the optical sensor increases, and the cost also increases because of the PSD or the CCD.

SUMMARY OF THE INVENTION

At least one exemplary embodiment of the present invention is directed to an inexpensive and simple optical sensor that detects the distance between the sensor and a detecting object to be measured. For example, by applying the optical sensor of at least one exemplary embodiment of the present invention to an inkjet recording apparatus, the thickness of a recording sheet can be detected with high precision.

A sensor according to an aspect of the present invention includes a light-emitting element configured to emit light onto a measuring surface, and a plurality of light-receiving elements configured to receive reflected light of the emitted light that is reflected by the measuring surface. Light-receiving axes of the light-receiving elements do not cross one another.

A recording apparatus according to another aspect of the present invention forms an image on a recording medium, and includes a detecting device that detects the thickness of the recording medium with the above-described sensor.

A sensor according to a further aspect of the present invention includes a first light-emitting element configured to emit light onto a measuring surface at a first angle; a second light-emitting element configured to emit light onto the measuring surface at a second angle different from the first angle; and a plurality of light-receiving elements configured to receive the light emitted from each of the first and second light-emitting elements after the light is reflected by the measuring surface. The first and second light-emitting elements and the light-receiving elements are arranged so that an intersection of the light-receiving axis of at least one of the light-receiving elements and the measuring surface placed at a predetermined position does not coincide with intersections of light-emitting axes of the first and second light-emitting elements and the measuring surface.

A sensor according to a further aspect of the present invention includes a light-emitting element configured to emit light onto a measuring surface, and a plurality of light-receiving elements configured to receive reflected light from the measuring surface. The plurality of light-receiving elements are arranged to be shifted in the direction where a light of a specular reflected light component shifts when the measuring surface is displaced.

A sensor according to a further aspect of the present invention includes a light-emitting element configured to emit light onto a measuring surface, and a plurality of light-receiving elements configured to receive reflected light from the measuring surface. A center point of a light-emitting region on the measuring surface in which light is applied from the light-emitting element does not coincide with the center point of a light-receiving region on the measuring surface in which at least one of the plurality of light-receiving elements can receive light.

According to at least one aspect of the present invention, since the light-emitting element and the light-receiving elements are arranged so that the light-receiving axes of the light-receiving elements do not cross, different output values can be obtained from the light-receiving elements depending on the position of the measuring surface. As a result, the distance between the sensor and the measuring surface can be precisely detected even with inexpensive light-emitting and light-receiving elements.

Further features of the present invention will become apparent from the following description of exemplary embodiments with reference to the attached drawings.

DESCRIPTION OF THE EMBODIMENTS

Figure 1:
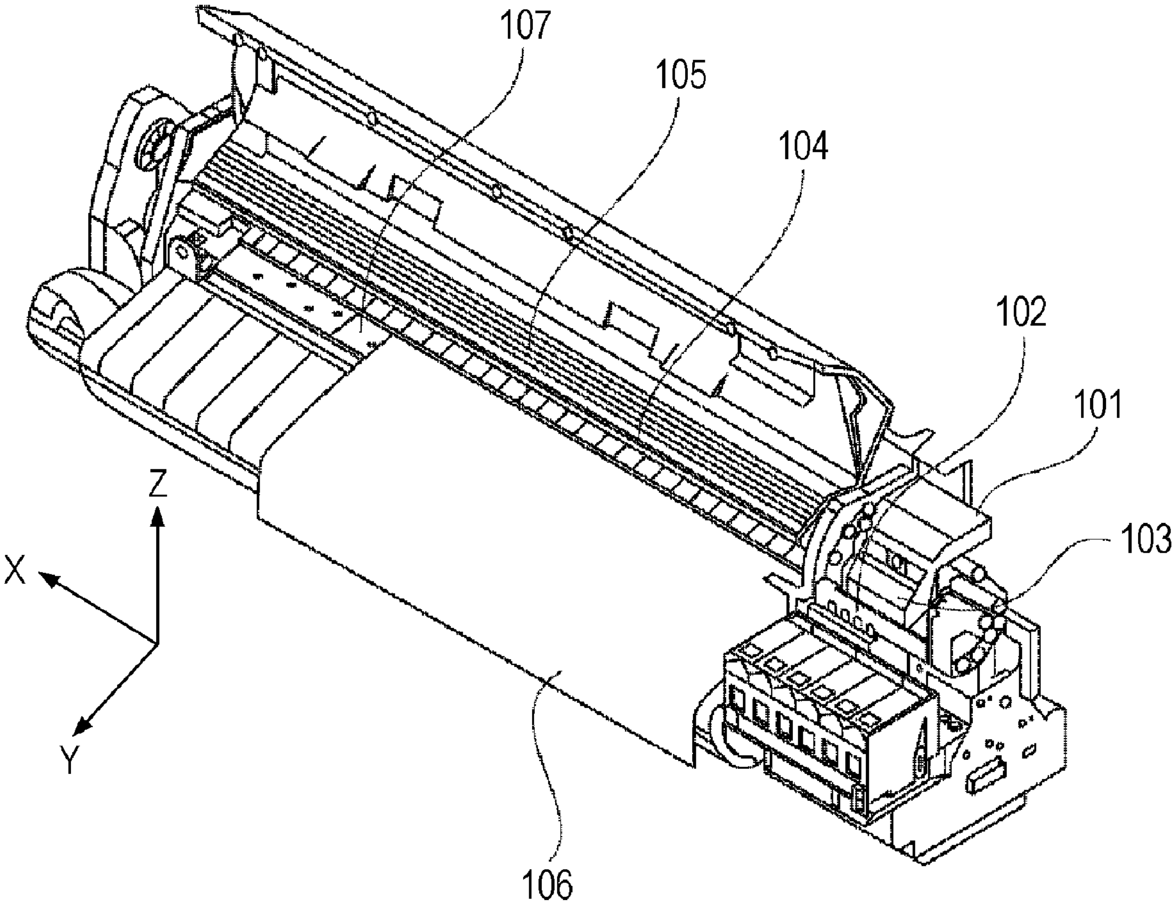
FIG. 1 is a perspective view showing a carriage and its surroundings in an inkjet printer.

The following description of at least one exemplary embodiment is merely illustrative in nature and is in no way intended to limit the invention, its application, or uses.

Processes, techniques, apparatus, and materials as known by one of ordinary skill in the relevant art can not be discussed in detail but are intended to be part of the enabling description where appropriate, for example the fabrication of the light receiving elements and their materials.

In all of the examples illustrated and discussed herein any specific values, for example the reflection angle, should be interpreted to be illustrative only and non limiting. Thus, other examples of the exemplary embodiments could have different values.

Notice that similar reference numerals and letters refer to similar items in the following figures, and thus once an item is defined in one figure, it can not be discussed for following figures.

Exemplary embodiments of the present invention will be described in detail below with reference to the drawings.

A recording sheet (also referred to as a recording medium) broadly includes not only a sheet of paper for use in general recording apparatuses, but also other sheets that can receive ink, for example, a plastic film, a metal plate, glass, and leather and other recording medium as known by one of ordinary skill in the relevant arts and equivalents.

First Exemplary Embodiment

In a first exemplary embodiment of the present invention, an optical sensor is applied to an inkjet recording apparatus.

The first exemplary embodiment is directed to an optical sensor that can detect not only the thickness of a recording sheet, but also an end of the recording sheet, the recording density, and the type of the recording sheet. While optical sensors have been used for these various detection purposes, they have different configurations corresponding to the purposes. Therefore, it is difficult to use an integrated optical sensor for these detection purposes. If an attempt is made to combine the optical sensors, the optical sensors are complicated, and therefore, a combination sensor of the optical sensors has a large size. As a result, the size of a recording apparatus in which the combination sensor is mounted is also increased. Moreover, since expensive elements can be necessary for precise detection, the sensor and the recording apparatus can also be expensive.

Inkjet Recording Apparatus (FIG. 1)

FIG. 1 is an outside perspective view schematically showing an inkjet recording apparatus.

In the inkjet recording apparatus, a recording head 103 and a multipurpose sensor (optical sensor) 102 for various detection purposes are mounted on a carriage 101, as shown in FIG. 1. The carriage 101 is reciprocatingly scanned in the X-direction on a shaft 105 by a carriage belt 104. A recording sheet 106 (recording medium) is fed in the Y-direction on a platen 107 by a feeding roller (not shown). A direction perpendicular to an XY plane defined by the X- and Y-directions is designated as the Z-direction. Herein, sides to which the arrows X, Y, and Z in FIG. 1 point are defined as downstream sides, and opposite sides are defined as upstream sides.

During recording, the carriage 101 discharges ink droplets from the recording head 103 while scanning the recording sheet 106, which is placed on the platen 107, in the X-direction. When scanning to an X-direction end of the recording sheet 106 by the carriage 101 is completed, the feeding roller feeds the recording sheet 106 in the Y-direction by a predetermined amount so that a region of the recording sheet 106 to be subjected to the next recording is placed on the platen 107. By repeating these operations, an image is formed on the recording sheet 106.

The multipurpose sensor 102 can detect the width of the recording sheet 106 by detecting an X-direction end of the recording sheet 106, and can detect a leading or trailing end of the recording sheet 106 by detecting a Y-direction end. The multipurpose sensor 102 can also detect the thickness of the recording sheet 106 by detecting the distance between the multipurpose sensor 102 and a surface of the recording sheet 106, and can detect the type of the recording sheet 106 by detecting the state of the surface of the recording sheet 106 (e.g., smoothness or glossiness). The multipurpose sensor 102 can also detect the recording density of a recorded patch (pattern). Determination of the recording position and color calibration for calibrating the recording color can be performed on the basis of the detected recording density. In this way, the multipurpose sensor 102 is an optical sensor that can be used for various detection purposes. The multipurpose sensor 102 can be mounted at a lateral end of the carriage 101 so that a measuring region thereof is provided upstream from the recording position of the recording head 103 in the Y-direction. A lower surface of the multipurpose sensor 102 can be flush with or higher than a lower surface of the recording head 103. By thus placing the multipurpose sensor 102 at this position, the width of the recording sheet 106 can be detected before a recording operation, and the recording operation can be performed without feeding the recording sheet 106 in the reverse direction (upstream in the Y-direction).

Figure 2A:
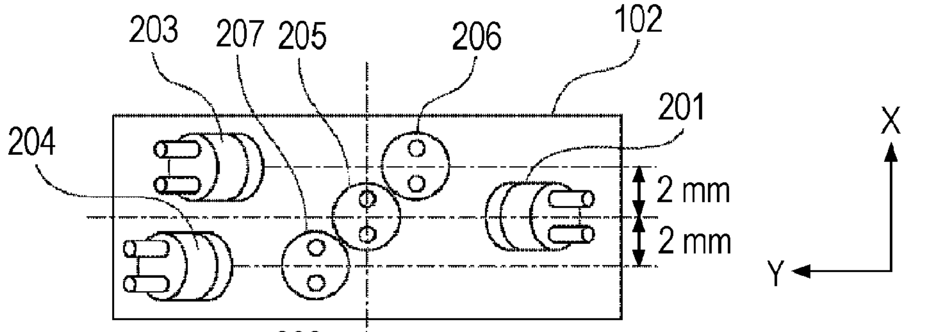
FIGS. 2A and 2B are a plan view and a side view, respectively, showing the configuration of a multipurpose sensor according to a first exemplary embodiment of the present invention.
Figure 2B:
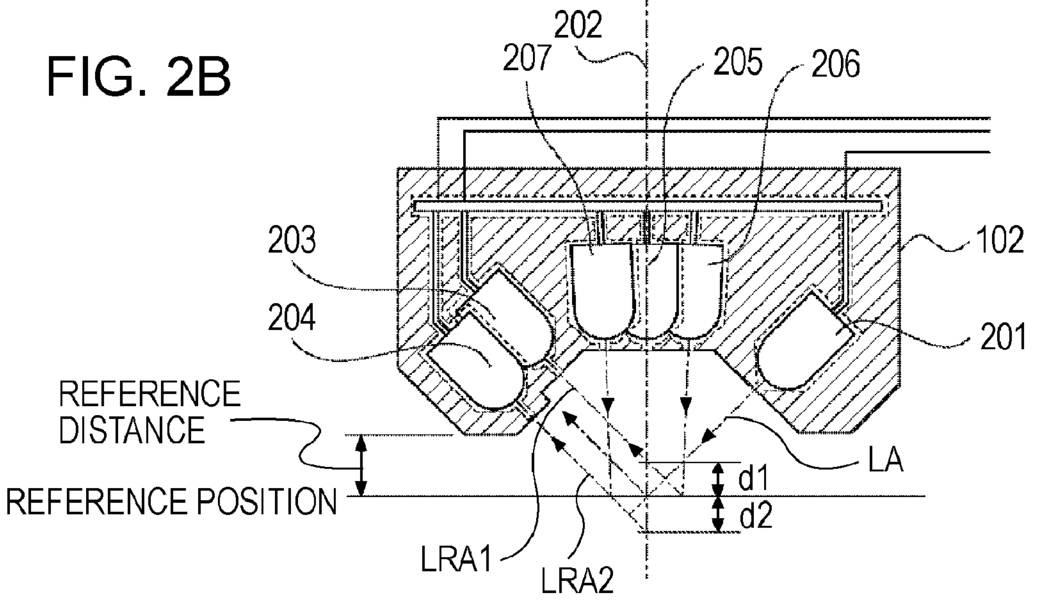

FIGS. 2A and 2B are a plan view and a side view, respectively, showing the configuration of the multipurpose sensor 102.

The multipurpose sensor 102 includes optical elements, namely, two phototransistors (photodiodes) 203 and 204, three visible LEDs 205, 206, and 207, and one infrared LED 201. These optical elements are integrally provided, and are driven by an external circuit (not shown). Each of the optical elements is shaped like a cannonball (e.g., having a diameter of approximately 4 mm at the maximum, a mass-produced type having a diameter of 3.0 to 3.1 mm). The visible LEDs 205, 206, and 207 and the infrared LED 201 serve as light-emitting elements (also referred to as light-emitting portions), and the phototransistors 203 and 204 serve as light-receiving elements (also referred to as light-receiving portions).

The infrared LED 201 is positioned such as to apply light at a light-emitting angle of about 45 degrees to a surface (measuring surface) of the recording sheet 106 that is parallel to the XY plane, and such that the center of the emitted light (the light axis of the emitted light, referred to as a light-emitting axis) crosses, at a predetermined position, a sensor center axis 202 parallel to the normal (Z-axis) to the measuring surface. The position of the cross point (intersection) on the Z-axis is defined as a reference position, and the distance between a lower end of the multipurpose sensor 102 and the reference position is defined as a reference distance. The width of light emitted from the infrared LED 201 is adjusted by an aperture so as to form a radiation face (light-emitting region) (e.g., having a diameter of approximately 4 to 5 mm on the measuring surface) disposed at the reference position. In the first exemplary embodiment, a line that connects a center point within a region emitted to the measuring surface by the light-emitting element and a center of the light-emitting element is called the light axis (LA) of the light-emitting element (light-emitting axis). This light-emitting axis is a center of the luminous flux of the emitted light.

The phototransistors 203 and 204 are sensitive to light within the range of visible light to infrared light. When the measuring surface is placed at the reference position, the phototransistors 203 and 204 are arranged such that light-receiving axes thereof are parallel to the center axis of reflected light of the light emitted from the infrared LED 201. The light-receiving axis of the phototransistor 203 is shifted (e.g., by +2 mm) from the light axis of the infrared LED 201 in the X-direction, and d1 (e.g., by +2 mm) from the reference position in the Z-direction. The light-receiving axis of the phototransistor 204 is shifted (e.g., by −2 mm) from the light axis of the infrared LED 201 in the X-direction, and d2 (e.g., by −2 mm) from the reference position in the Z-direction. When the measuring surface is at the reference position, light emitted from the infrared LED 201 is reflected at an angle (e.g., of about 45 degrees). Reflected light at an angle equal to the light-emitting angle is particularly referred to as specular reflected light. Since the light axis (reflection axis) of specular reflected light does not coincide with the light-receiving axes of the phototransistors 203 and 204, as shown in FIG. 2B, the phototransistors 203 and 204 do not directly receive the specular reflected light. However, when the measuring surface is at the reference position, the light axis of specular reflected light is parallel to the light-receiving axes of the phototransistors 203 and 204, and therefore, the phototransistors 203 and 204 can receive reflected light close to specular reflected light. In the first exemplary embodiment, a line that connects a center point in region where the receiving light is possible in the measuring surface and a center of the light-receiving element is called the light axis of the light-receiving element (light-receiving axis, LRA1 and LRA2). This light-receiving axis is a center of the luminous flux of the reflected light received by the light-receiving element.

In the multipurpose sensor 102 of the first exemplary embodiment, in the region where a multipurpose sensor can be measured, the infrared LED 201, serving as the light-emitting element, and the phototransistors 203 and 204, serving as the light-receiving elements, are arranged so that the center (light axis LA) of the light-emitting region where light is applied onto the measuring surface by the infrared LED 201 does not cross (not coincide with) the centers (light axes) of the light-receiving regions where the phototransistors 203 and 204 receive light reflected by the measuring surface. In other words, two light-receiving elements of the multipurpose sensor 102 are arranged to be shifted as the direction where a light of a specular reflected light component shifts when the measuring surface is displaced.

When the measuring surface is at the reference position, the intersection of the measuring surface and the light-emitting axis of the infrared LED 201 coincides with the intersection of the measuring surface and the light-emitting axis of the visible LED 205, and the intersection is provided between the light-receiving regions of the phototransistors 203 and 204. A spacer (e.g., having a thickness of approximately 1 mm) is provided between the phototransistors 203 and 204 so that light to be received by one of the phototransistors enters the other phototransistor. An aperture for restricting the light incident region is provided at each of the phototransistors 203 and 204 so that the phototransistor can receive only light reflected from a region with a certain diameter (e.g., a diameter of 3 to 4 mm) on the measuring surface placed at the reference position.

In FIGS. 2A-2B, a single-color visible LED 205 for green light (e.g., having a wavelength of approximately 510 to 530 nm) is placed so that its light axis coincides with the sensor center axis 202. The green visible LED 205 and the phototransistors 203 and 204 are also arranged so that the light axes thereof do not cross.

A single-color visible LED 206 for blue light (e.g., having a wavelength of approximately 460 to 480 nm) is shifted from the light axis of the green visible LED 205 (e.g., by +2 mm) in the X-direction and (e.g., by −2 mm) in the Y-direction, as shown in FIG. 2A. The visible LED 206 is placed so that the light-emitting axis thereof crosses the light-receiving axis (LRA1) of the phototransistor 203 at the intersection of the light-emitting axis and the measuring surface when the measuring surface is placed at the reference position.

A single-color visible LED 207 for red light (e.g., having a wavelength of approximately 620 to 640 nm) is shifted from the light axis of the green visible LED 205 (e.g., by −2 mm) in the X-direction and (e.g., by +2 mm) in the Y-direction, as shown in FIG. 2A. The visible LED 207 is placed so that the light-emitting axis thereof crosses the light-receiving axis (LRA2) of the phototransistor 204 at the intersection of the light-emitting axis and the measuring surface when the measuring surface is placed at the reference position.

As shown in FIG. 2B, light beams emitted from the visible LEDs 205 to 207 are reflected by the measuring surface at an angle different from the light-emitting angle. Such reflected light reflected at an angle different from the light-emitting angle is referred to as diffuse reflected light (scattered reflected light, specular reflected light). The visible LED 205 and the phototransistors 203 and 204 are arranged so that the light axis of diffuse reflected light is parallel to the light-receiving axes (LRA1 and LRA2) of the phototransistors 203 and 204 when the measuring surface is placed at the reference position.

While each of the optical elements is shaped like a cannonball in the multipurpose sensor 102 of the first exemplary embodiment, it does not always need to be shaped like a cannonball. It is satisfactory as long as the optical element has a shape such as to maintain the positional relationship. For example, some or all of the optical elements can be changed to a chip-type LED or a side-view light-receiving element. Further, optical adjustment can be made by a lens placed near the aperture.

Figure 3:
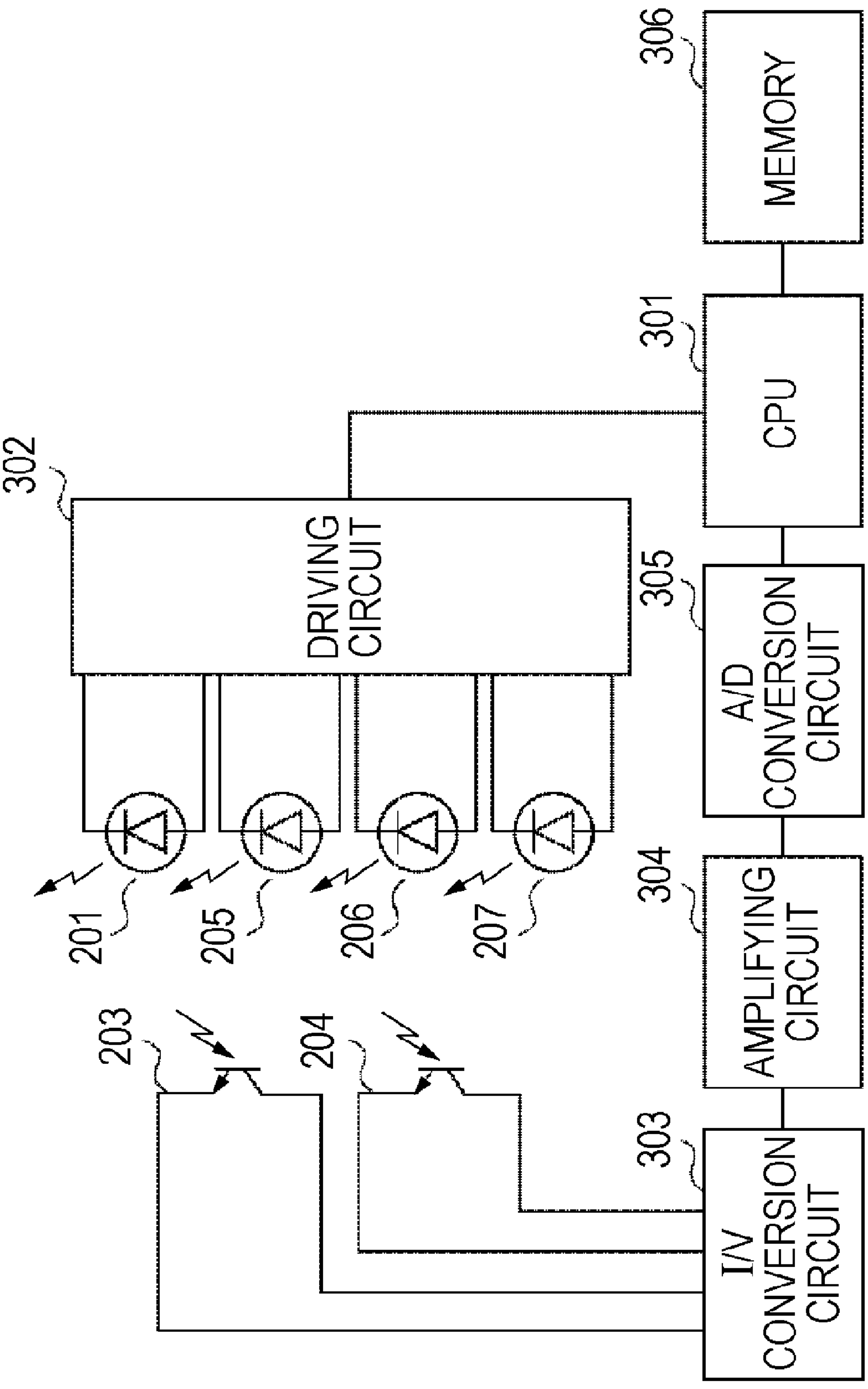
FIG. 3 is a block diagram of an external circuit of the multipurpose sensor.

FIG. 3 is a block diagram showing the configuration of a control circuit that processes signals input to and output from the multipurpose sensor 102.

A CPU 301 for controlling the multipurpose sensor 102 outputs on/off control signals for the infrared LED 201 and the visible LEDs 205 to 207, and processes output signals obtained in accordance with the amount of light received by the phototransistors 203 and 204. A driving circuit 302 supplies a constant current to each LED for light emission in response to an ON signal from the CPU 301, and adjusts the amount of light emitted from the LED so that the phototransistors 203 and 204 can receive a predetermined amount of light. An I/V conversion circuit 303 converts current values of output signals from the phototransistors 203 and 204 into voltage values. An amplifying circuit 304 amplifies weak output signals converted into the voltage values to a level best-suited to A/D conversion. An A/D conversion circuit 305 converts the output signals amplified by the amplifying circuit 304 into 10-bit digital signals, and inputs the digital signals to the CPU 301. The digital signals are temporarily stored in a memory 306.

A reference table useful for an operation of determining the type of the recording sheet, which will be described below, and so on are prestored in the memory 306. The CPU 301 can read the information from the memory 306.

A description will now be given of a procedure for detecting the end of the recording sheet 106 with the multipurpose sensor 102 having the above-described configuration.

In order to detect the end of the recording sheet 106, a difference between outputs from the phototransistors 203 and 204 is calculated. First, the multipurpose sensor 102 is moved onto the recording sheet 106, and the infrared LED 201 is turned on. Adjustment is made by the amplifying circuit 304 so that the outputs from the phototransistors 203 and 204 become equivalent to each other, and gains made at this time are fixed. Subsequently, the end of the recording sheet 106 is detected by relatively moving the multipurpose sensor 102 and the recording sheet 106 while sampling output values from the phototransistors 203 and 204 in a constant cycle. More specifically, in order to detect a leading end of the recording sheet 106 in the feeding direction, the recording sheet 106 is fed without moving the multipurpose sensor 102. In order to detect the width of the recording sheet 106 in the scanning direction, the multipurpose sensor 102 is moved to the end of the recording sheet 106 by scanning the carriage 101, and the end is detected.

When the multipurpose sensor 102 is placed on the recording sheet 106, output values from the phototransistors 203 and 204 are at the same level as that when the gains are initially adjusted, and therefore, there is little difference between the output values. When the multipurpose sensor 102 reaches the vicinity of the end of the recording sheet 106, a part of the light-receiving region of one of the phototransistors 203 and 204 comes out of the measuring surface, and this phototransistor does not receive reflected light of the infrared LED 201. The output of the phototransistor that does not receive reflected light becomes low.

Figure 4:
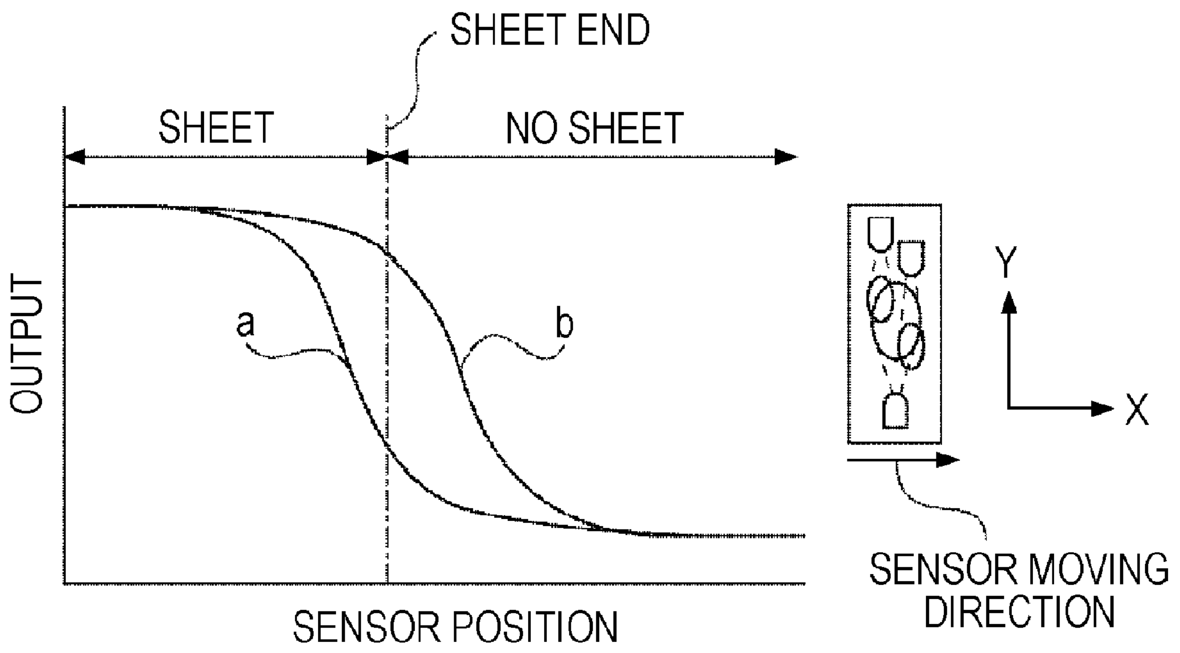
FIG. 4 is a graph showing changes in outputs at a sheet end in the first exemplary embodiment.

FIG. 4 shows changes of the output values from the two phototransistors 203 and 204 obtained when the detecting region of the multipurpose sensor 102 moves from the recording sheet to the outside of the recording sheet.

In FIG. 4, “a” represents the output from the phototransistor 203, and “b” represents the output from the phototransistor 204. As the relative positions of the multipurpose sensor 102 and the recording sheet 106 change, the output “a” of the phototransistor 203 closer to the end of the recording sheet earlier starts to decline, and the output “b” of the phototransistor 204 subsequently declines. The difference between the declining amounts of the outputs of the phototransistors 203 and 204 is formed in the X-direction.

In the first exemplary embodiment, the outputs of the phototransistors 203 and 204 are monitored, and the positions of the multipurpose sensor 102 taken, when the outputs are respectively reduced to half the initially adjusted outputs, are recorded. A midpoint between the positions is calculated by the CPU 301. At this midpoint, a midpoint between the phototransistor 203 and the phototransistor 204 coincides with the end of the recording sheet 106. For this reason, the absolute position and width of the recording sheet 106 can be detected on the basis of the positions of the multipurpose sensor 102.

As described above, the end of the recording sheet 106 can be detected with the multipurpose sensor 102.

A sensor for detecting the end of the recording sheet generally includes one light-emitting element and one light-receiving element. When the reflection intensity falls below a threshold value, the position of the sensor is detected as the end of the recording sheet. In this method, however, if the recording sheet is waved and the measuring surface is higher or lower than the reference position, the timing at which the reflection intensity falls below the threshold value is shifted from the timing in a normal condition of the recording sheet. This results in incorrect detection.

In contrast, the multipurpose sensor 102 of the first exemplary embodiment includes two light-receiving elements. Light emitted from the light-emitting element and reflected by the measuring surface is simultaneously received by the light-receiving elements arranged in a manner such that the light-receiving regions thereof are adjacent to each other, and the end of the recording sheet is detected on the basis of the output values from the light-receiving elements. Consequently, the change of the output due to waving of the recording sheet can be cancelled. Even when the distance between the multipurpose sensor 102 and the measuring surface changes, the end can be detected precisely. In this case, even in a marginless recording mode in which recording is performed to the edge of the recording sheet with no margin, or even when the size of the recording sheet is improperly set by the user, an image is not recorded outside the recording sheet, and soiling of the inside of the recording apparatus can be reduced. Further, even when the size of the recording sheet is not set by the user, the recording apparatus can automatically set the size of the recording sheet.

In the multipurpose sensor 102, the infrared LED 201 is turned on to emit light, and the emitted light is received after regularly reflected by the surface of the recording sheet 106, thereby detecting the end of the recording sheet 106 with the specular reflected light. Since the multipurpose sensor 102 includes the visible LED 205, the end of the recording sheet 106 can also be detected with diffuse reflected light of visible light from the visible LED 205 that is reflected by the measuring surface. One can select between the two detection methods depending on the reflection characteristic of the recording sheet 106. For example, when the recording sheet 106 is a glossy sheet having high surface smoothness, since reflected light from the sheet contains a lot of specular reflected light components, the end can be detected with the infrared LED 201 turned on. When the recording sheet 106 is a plane paper sheet having low surface smoothness, since reflected light from the sheet contains a lot of diffuse reflected light components, the end can be detected with the visible LED 205 turned on.

While the CPU 301 determines the end position on the basis of the positions of the multipurpose sensor 102 taken when the outputs from the phototransistors 203 and 204 are reduced to half the peak outputs, exemplary embodiments of the present invention are not limited to this method. For example, outputs from the phototransistors 203 and 204 can be compared by a comparator, and the position where the outputs become equal can be determined as the midpoint. In this case, the processing load on the CPU 301 is reduced, and the end detection can be performed at a higher speed.

A description will now be given of a procedure for detecting the color density of patches printed on the recording sheet 106 with the multipurpose sensor 102.

First, the recording sheet 106 is fed in the Y-direction so that a region to be printed is placed on the platen 107, and desired patches (predetermined patterns) are printed in the region. The patches, for example, images having a size of 5 mm×5 mm, are respectively formed by discharging cyan ink onto the region at the discharging rates of 10%, 50%, and 100%. When printing of the patches is completed, the visible LED with a wavelength corresponding to a complementary color to the color that is to be measured for density is turned on. For example, in order to measure the cyan density of the printed patches, the visible LED 207 with a red light wavelength (620 to 640 nm) is turned on.

Subsequently, the multipurpose sensor 102 is moved onto a no-patch region of the recording sheet 106 where a color patch is not printed, and the intensity of reflected light (reflection intensity) is measured with the phototransistor 204 that is placed on the same plane as that of the visible LED 207. The reflection intensity is stored as a reference value in the memory 306. When the color patches are measured, the recording sheet 106 is transferred (conveyed) in the reverse direction so that the multipurpose sensor 102 can scan the area of the color patches on the recording sheet 106.

Then, the multipurpose sensor 102 is moved onto the region of the recording sheet 106 on which the patches are printed, and the reflection intensities corresponding to the patches are measured. Since a part of red light emitted from the visible LED 207 is absorbed by the printed cyan ink on the patches, the reflection intensities are lower than in the no-patch region. Consequently, the amount of light received by the phototransistor 204 is reduced. The measured reflection intensity is stored in the memory 306.

The relative color density D on the recording sheet 106 can be given by the following expression:

$$D = \log 10(Vr/Vp)$$

where Vr represents the reflection intensity at the no-patch region of the recording sheet 106, and Vp represents the reflection intensity on the patch.

In order to find an actual color density from the obtained relative color density D, a conversion table created on the basis of the characteristics of the recording sheet 106 and the multipurpose sensor 102 is read out. The color density of the patch printed on the recording sheet 106 is found on the basis of the correspondence between the type of the recording sheet and the relative color density D.

By the above-described procedure, the color density of the patch printed on the recording sheet 106 can be measured with the multipurpose sensor 102. By thus detecting the color density of the patch, color calibration can be performed so that the image (patch) printed on the recording sheet has a predetermined recording density. When the color density of a patch in which a pattern necessary for positioning the recording head is recorded is detected, a recording condition for placing the recording head at the recording position can be obtained.

In order to detect the density of a yellow color patch, the visible LED 206 with a blue light wavelength is turned on, the reflection density is measured with the phototransistor 203 that is placed on the same plane as that of the visible LED 206, and the measured reflection intensity is converted into the density with reference to a density calculation table. In order to detect the density of a magenta color patch, the visible LED 205 with a green light wavelength placed on the center axis 202 of the multipurpose sensor 102 is turned on. The reflection intensity can be measured with any of the phototransistors 203 and 204. For this reason, the density of the color patch can be precisely detected by averaging the values measured by the phototransistors 203 and 204. In this case, only an output from the phototransistor having higher performance can be used.

In order to reduce the size of the sensor for detecting the color density, for example, one can use a three-color integrated LED or a white LED as the light-emitting element. However, when a three-color integrated LED is used, light beams of three colors are radially emitted from the tip of the LED, and therefore, it is difficult to align the light-emitting axes and the light-receiving axis. Moreover, the LED itself is expensive. When a white LED is used, there is a need to provide a color filter in the light-receiving element, which increases the cost.

The multipurpose sensor 102 of the first exemplary embodiment includes three inexpensive single-color visible LEDs, and the positions of the LEDs are shifted from one another in the Y-direction in order to minimize the increase in the size of the multipurpose sensor 102 in the X-direction. Moreover, since reflected light from the three visible LEDs is received by the two light-receiving elements, the reflection intensity can be measured in a state in which the elements are arranged in a range of 0 to 45 degrees. This arrangement provides high sensitivity.

A description will now be given of a procedure for detecting the distance to the recording sheet 106 with the multipurpose sensor 102 having the above-described configuration.

When the recording sheet 106 is conveyed onto the platen 107 by the feeding roller, the multipurpose sensor 102 is moved to the recording sheet 106, and the infrared LED 201 is turned on. Light emitted from the infrared LED 201 is reflected by a measuring surface, and a part of the reflected light is received by the phototransistors 203 and 204. Outputs from the phototransistors 203 and 204 vary depending on the distance to the measuring surface. The outputs also vary depending on the overlapping areas between the light-emitting region of the infrared LED 201 and the light-receiving regions of the phototransistors 203 and 204.

Figure 5A:
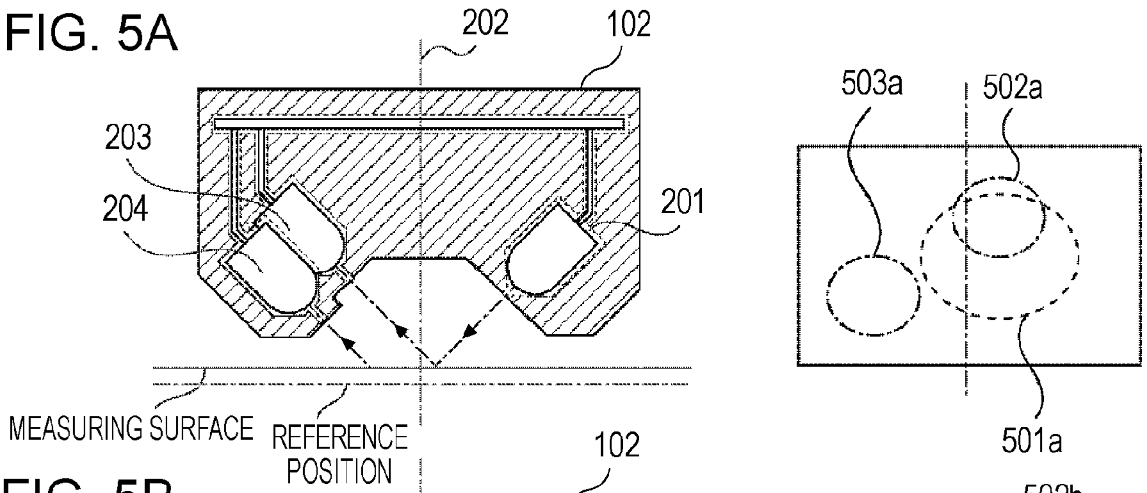
FIGS. 5A to 5C are explanatory views showing changes of a light-emitting region and light-receiving regions depending on the distance between the multipurpose sensor and a measuring surface in the first exemplary embodiment.
Figure 5B:
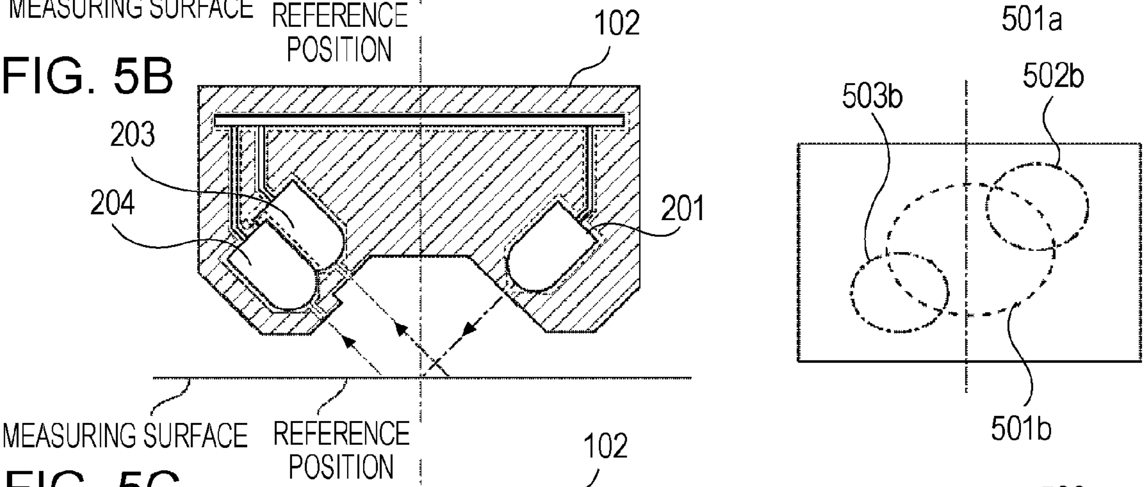
Figure 5C:
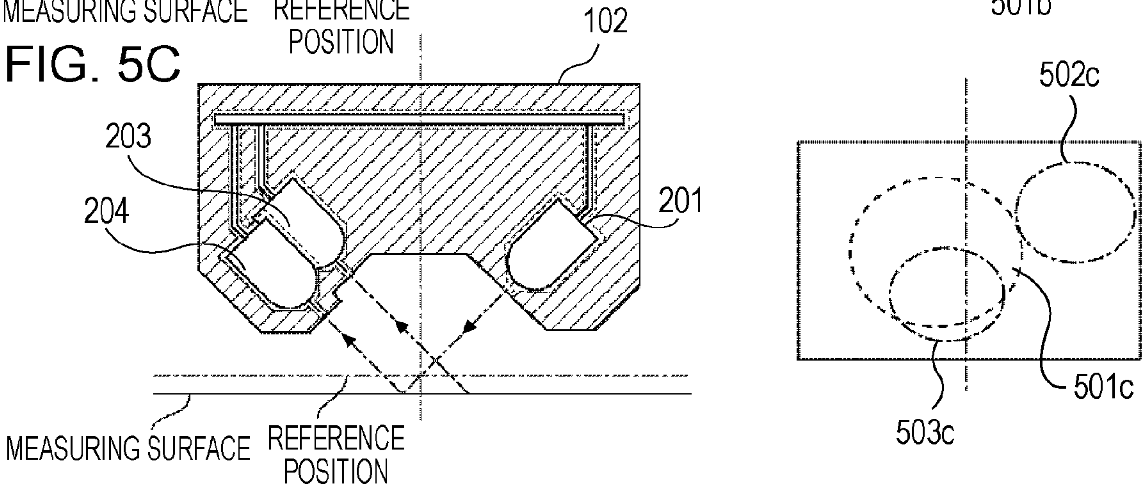

FIGS. 5A to 5C show how the positions of the light-emitting region and the light-receiving regions change depending on the distance between the multipurpose sensor 102 and the measuring surface. In FIGS. 5A to 5C, reference numerals 501*a-c*, 502*a-c*, and 503*a-c* denote a light-emitting region of the infrared LED 201, a light-receiving region of the phototransistor 203, and a light-receiving region of the phototransistor 204, respectively.

Figure 6:
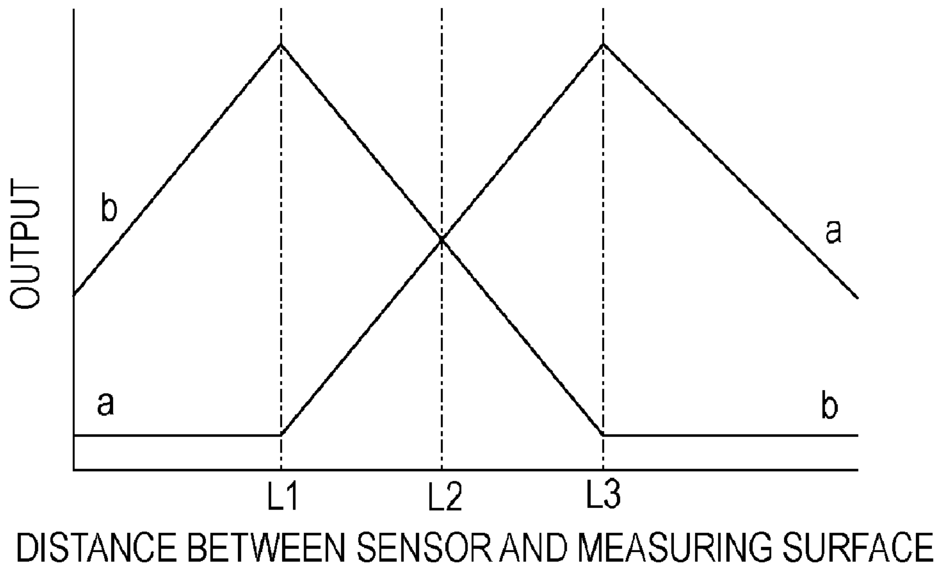
FIG. 6 is graph showing output changes depending on the distance between the multipurpose sensor and the measuring surface.

FIG. 6 shows how the outputs from the phototransistors 203 and 204 change depending on the distance between the multipurpose sensor 102 and the measuring surface. In FIG. 6, line "a" shows the output from the phototransistor 203, and line "b" shows the output from the phototransistor 204.

As shown in FIGS. 5A to 5C, the centers of the light-receiving regions 502*a-c* and 503*a-c* are not aligned with the center of the light-emitting region 501*a-c*. For this reason, even when the distance between the multipurpose sensor 102 and the measuring surface slightly changes, overlapping areas between the light-emitting region 501*a-c* and the light-receiving regions 502*a-c* and 503*a-c* greatly change, compared with the case in which the light-receiving region passes through the center of the light-emitting region.

FIG. 5A shows an overlapping state between the light-emitting region 501*a* and the light-receiving regions 502*a* and 503*a* when the measuring surface is shifted by approximately 1 mm from the reference position toward the multipurpose sensor 102 (L1, FIG. 6). In this case, most of the light-receiving region 502*a* overlaps with the light-emitting region 501*a*. Therefore, the output (line b) from the phototransistor 203 obtained at this time is the highest, as shown in FIG. 6. In contrast, since the light-receiving region 503*a* is outside the light-emitting region 501*a*, the output (line a) from the phototransistor 204 is the lowest.

FIG. 5B shows an overlapping state between the light-emitting region 501*b* and the light-receiving regions 502*b* and 503*b* when the measuring surface is placed at the reference position (L2, FIG. 6). In this case, the overlapping area between the light-receiving region 502*b* and the light-emitting region 501*b* is substantially equal to the overlapping area between the light-receiving region 503*b* and the light-emitting region 501*b*. Therefore, the outputs from the phototransistors 203 and 204 are substantially equal, and are almost half the peak values, as shown in FIG. 6.

FIG. 5C shows an overlapping state between the light-emitting region 501*c* and the light-receiving regions 502*c* and 503*c* when the measuring surface is shifted by approximately 1 mm from the reference position away from the multipurpose sensor 102 (L3, FIG. 6). In this case, most of the light-receiving region 503*c* overlaps with the light-emitting region 501*c*. Therefore, the output (line a) from the phototransistor 204 is the highest, as shown in FIG. 6. In contrast, since the light-receiving region 502*c* is outside the light-emitting region 501*c*, the output (line b) from the phototransistor 203 is the lowest.

In this way, the outputs from the phototransistors 203 and 204 change depending on the distance between the multipurpose sensor 102 and the measuring surface. The distance between the position where the output from the phototransistor 203 becomes the highest and the position where the output from the phototransistor 204 becomes the highest is determined by the amount of shift between the phototransistors 203 and 204 in the Z-direction, the inclination of the phototransistors 203 and 204 with respect to the measuring surface, and the inclination of the infrared LED 201 with respect to the measuring surface. The arrangement of the elements is optimized in accordance with the measuring range.

The outputs from the phototransistors 203 and 204 differ with the change in the distance to the recording sheet 106. The CPU 301 calculates the distance coefficient L on the basis of the outputs. The distance coefficient L is given by the following expression:

$$L=(Va-Vb)/(Va+Vb)$$

where Va represents the output from the phototransistor 203, and Vp represents the output from the phototransistor 204.

According to the above expression, the distance coefficient L varies with changes in the distance between the sensor 102 and the measuring surface. When the output (line b in FIG. 6) from the phototransistor 203 becomes the highest (L1), the distance coefficient L becomes the lowest. When the output (line a in FIG. 6) from the phototransistor 204 becomes the highest (L3), the distance coefficient L becomes the highest. In consideration of the property of the distance coefficient L, one can set the measuring range to a range between the position where the peak output of the phototransistor 203 is obtained and the position where the peak output of the phototransistor 204 is obtained, that is, for example the range of ±1 mm from the reference position in the multipurpose sensor 102 of the first exemplary embodiment.

When the distance coefficient L is calculated by the CPU 301, a distance reference table prestored in the memory 306 can be read.

Figure 7:
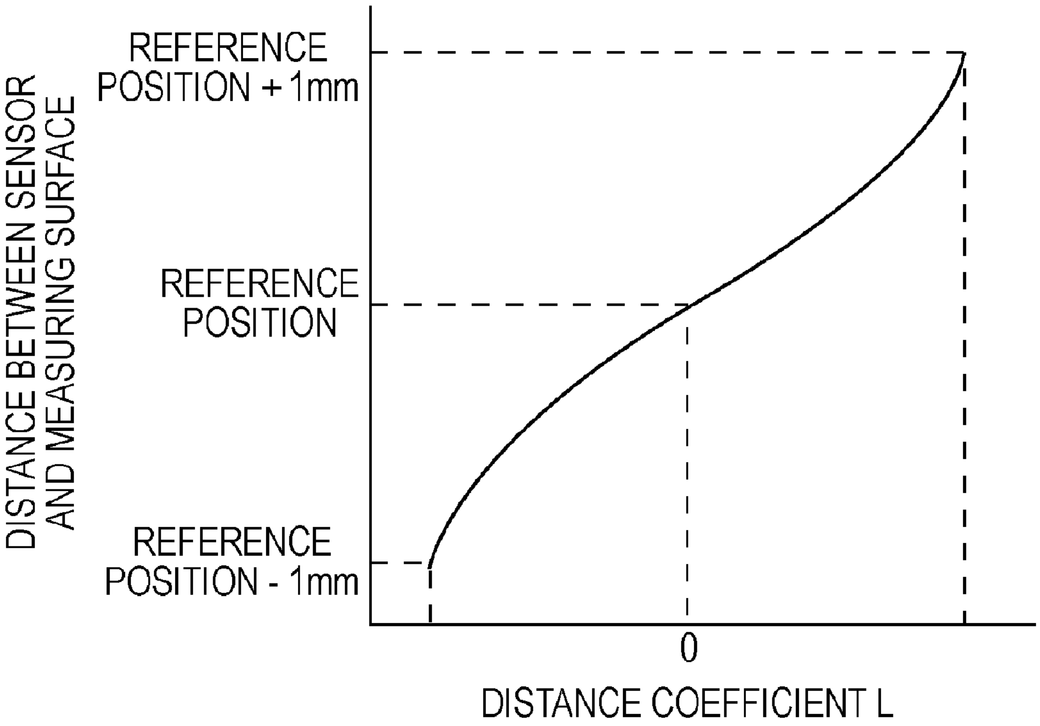
FIG. 7 is an explanatory view of a distance reference table adopted in the first exemplary embodiment.
Figure 8A:
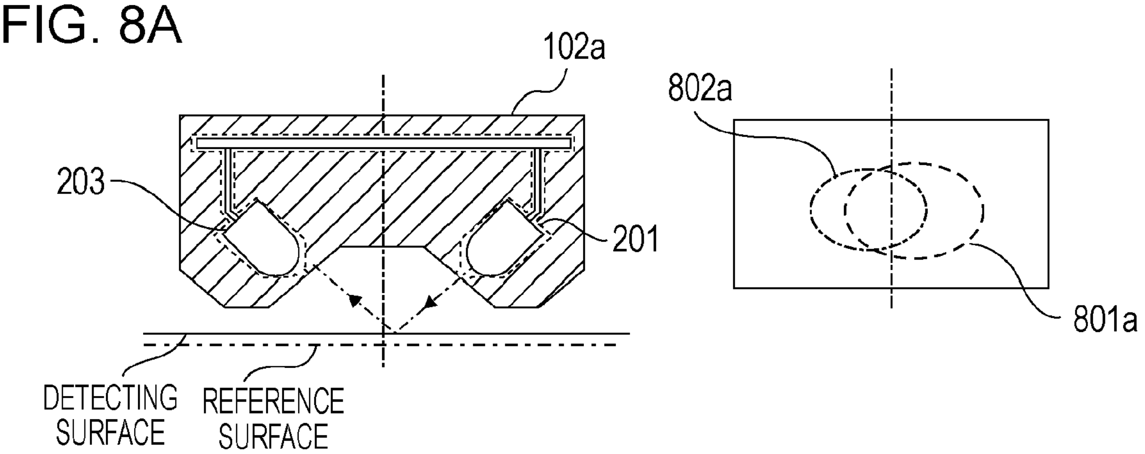
Prior Art FIG. 8A
FIGS. 8A to 8C are explanatory views showing changes of a light-emitting region and a light-receiving region depending on the distance between a known sensor and a measuring surface.
Figure 8B:
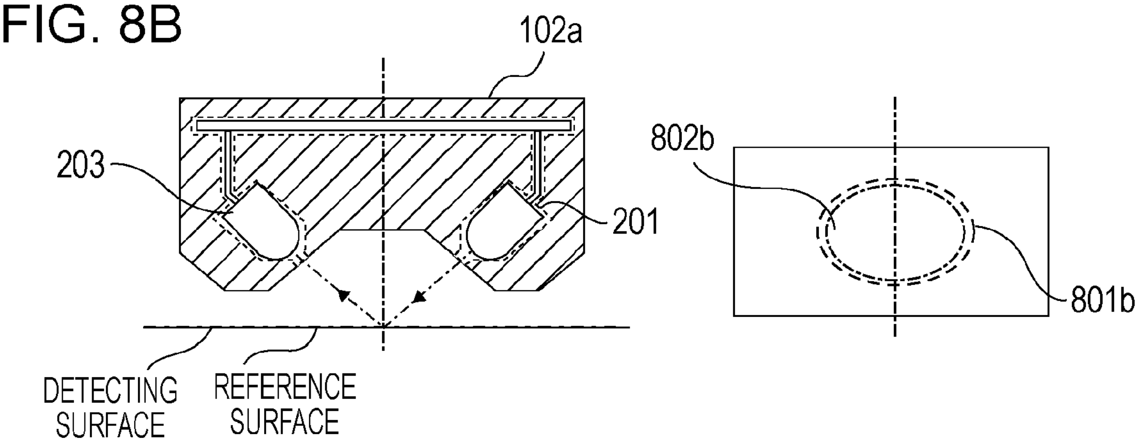
Figure 8C:
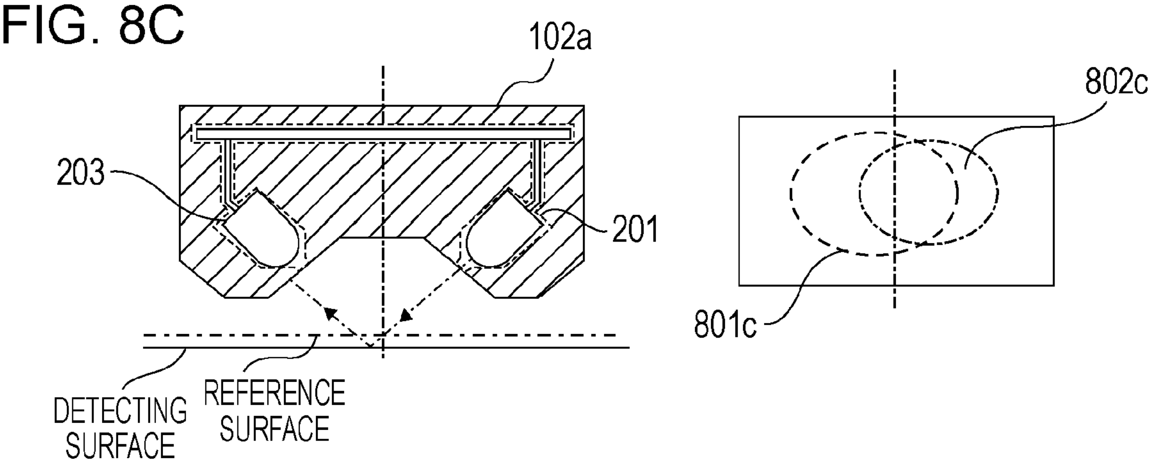
Figure 9:
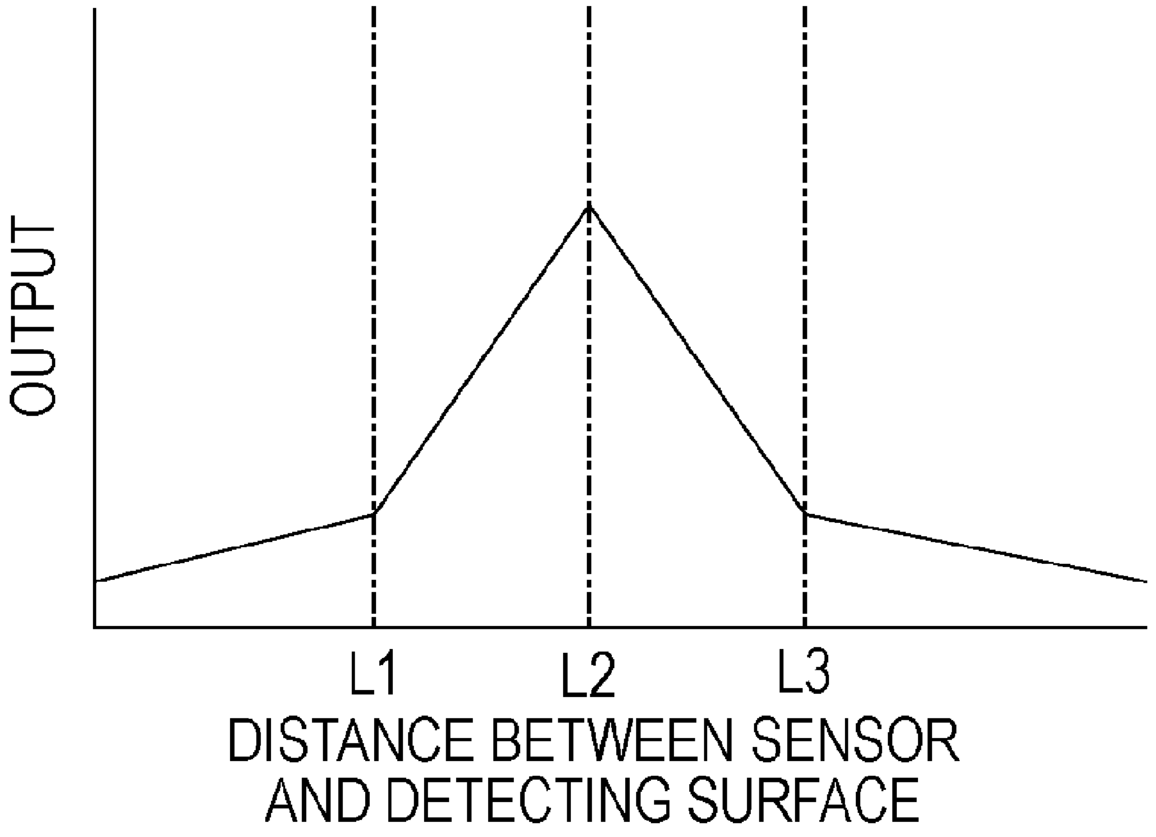
FIG. 9 is a graph showing output changes depending on the distance between the known sensor and the measuring surface.

FIG. 7 shows an example of a change curve of the distance coefficient L given by the distance reference table.

The distance coefficient L given by the above expression slightly changes in a curved manner depending on the distance because of the influence of the output characteristics of the phototransistors 203 and 204, but is substantially linear. The distance reference table helps to more precisely obtain the distance to the measuring surface from the calculated distance coefficient L.

The CPU 301 obtains the distance to the measuring surface by comparing the calculated distance coefficient L and the distance reference table, and outputs the obtained distance. When the distance to the measuring surface is obtained, the thickness of the recording sheet 106 can be calculated on the basis of the distance between the multipurpose sensor 102 and the platen 107. That is, the thickness of the recording sheet 106 can be found from the difference between the distance to the platen 107 used as the measuring surface and the distance to the recording sheet 106 used as the measuring surface.

As described above, the distance to the measuring surface can be detected with the multipurpose sensor 102.

By detecting the distance between the multipurpose sensor 102 and the surface of the recording sheet 106, it can also be checked whether the distance between the recording head 103 (FIG. 1) and the surface of the recording sheet 106 is proper. When the distance is too short, the recording head 103 easily touches and soils the surface of the recording sheet. When the distance is too long, the positions of ink droplets applied from the recording head 103 are easily displaced on the recording sheet 106, and the quality of a printed image is lowered. In order to solve these problems, the height of the recording head 103 can be adjusted in accordance with the measured distance to the surface of the recording sheet 106. When the recording position is adjusted beforehand, it sometimes deviates because of the change in the distance between the recording head 103 and the recording sheet 106 in an actual recording operation. In this case, the actual distance to the recording sheet is detected with the multipurpose sensor 102, and parameters for adjusting the recording position are corrected on the basis of the detected distance. Consequently, a high-quality image can be printed at a precise recording position even when recording sheets having different thicknesses are used.

Since two light-receiving elements and one light-emitting element are placed on the same plane in a general distance measuring sensor, the sensor can be influenced by fluctuations of the intensity of diffused light, and by blurring of the light-emitting region and the light-receiving regions due to the distance change. For this reason, the inclinations of the rising portion and the falling portion of the output curve of each light-receiving element on both sides of the peak value can be asymmetric. As a result, the precision of the distance measuring sensor is decreased by the influence of the low-sensitivity position.

In contrast, the use of the multipurpose sensor 102 of the first exemplary embodiment improves the symmetry of the rising portion and the falling portion of the output curve. More specifically, the characteristic of the distance coefficient L found from the ratio of the difference between the output signals from the two phototransistors 203 and 204 and the sum of the output signals is about linear with respect to the distance to the measuring surface, and distance detection can be performed precisely. For example, the multipurpose sensor 102 can detect the distance with a precision of 0.1 to 0.2 mm.

A description will now be given of a method for determining the type of the recording sheet with the multipurpose sensor 102.

In general, the reflection characteristic varies according to the type of the recording sheet. For example, a sheet having a high surface smoothness, such as a glossy sheet, provides a large amount of specular reflected light and a small amount of diffuse reflected light. In contrast, a sheet having a low surface smoothness, such as plain paper, provides a large amount of diffuse reflected light and a small amount of specular reflected light. In this way, the type of the recording sheet is determined on the basis of the reflection characteristic of the surface of the recording sheet. The type of the recording sheet can be determined with reference to a table that is stored in the memory 306 and that indicates the correspondences between the type of the recording sheet and the amount of regularly or diffuse reflected light from the recording sheet. By thus selecting any of the reflected light (light-emitting element) for detection in accordance with the type of the recording sheet, the thickness and end of any of various types of recording sheets can be detected precisely.

Since the reflection characteristic varies according to the type of the recording sheet, one can change the distance coefficient L in accordance with the characteristic of the recording sheet during distance measurement. In order to precisely detect the distance between the multipurpose sensor 102 and the surface of the recording sheet, a plurality of distance reference tables (FIG. 7) can be prepared corresponding to the types of the recording sheet, and the appropriate distance reference tables selected.

In the first exemplary embodiment, the infrared LED 201 and the phototransistors 203 and 204 are arranged to form the regular reflection angle in order to detect the distance to a recording sheet even when the recording sheet is a clear film. Since the multipurpose sensor 102 also includes the visible LED 205, when it is difficult to detect the distance using regular reflection, detection can be performed with diffuse reflected light from the recording sheet that is obtained by reflecting light perpendicularly applied from the visible LED 205 onto the recording sheet.

As described above, the first exemplary embodiment provides an inexpensive and small multipurpose sensor that can detect the end of the recording sheet, the color density of a print, and the distance to the measuring surface. In particular, since the light axis of the light-emitting element does not cross the light-receiving axes of a plurality of light-receiving elements, even when the measuring surface of the recording sheet is vertically shifted from the reference position closer to or away from the multipurpose sensor, outputs from the light-receiving elements can be made different. Therefore, the distance between the multipurpose sensor and the recording sheet can be detected precisely. Further, since the detection is performed on the basis of output signals from the two light-receiving elements that are shifted from each other in the feeding direction of the recording sheet and the normal direction, detecting light that should be enter one of the light-receiving elements is prevented from entering the other light-receiving element, and mutual interference between the output signals from the light-receiving elements is avoided. This increases the detection accuracy.

The light-emitting element for emitting light when detecting the amount of specular reflected light and the light-emitting element for emitting light when detecting the amount of diffuse reflected light are placed on the center axis of the multipurpose sensor, and the light-receiving elements are respectively disposed on both sides of the center axis. Therefore, the size of the multipurpose sensor can be reduced.

While the light-emitting element in the first exemplary embodiment emits visible light or infrared light (invisible light), it can also emit ultraviolet light as invisible light, besides the infrared light.

Second Exemplary Embodiment

A second exemplary embodiment of the present invention will be described in which a light-emitting element and light-receiving elements for measuring the distance between a multipurpose sensor and a measuring surface are arranged in another manner. The same components as those in the first exemplary embodiment are denoted by the same reference numerals.

Figure 10A:
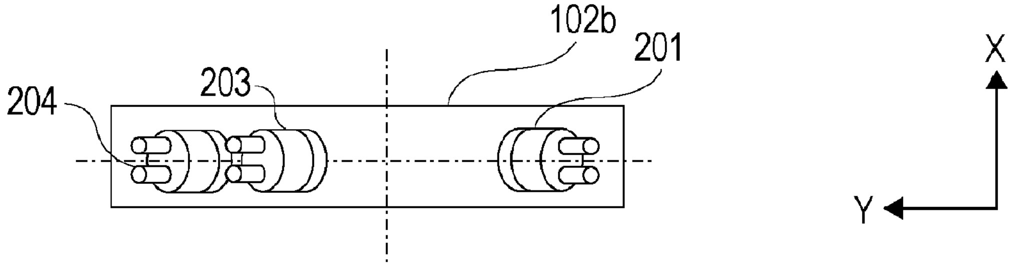
FIGS. 10A to 10E are explanatory views showing changes of a light-emitting region and light-receiving regions depending on the distance between a measuring surface and a sensor according to a second exemplary embodiment of the present invention.
Figure 10B:
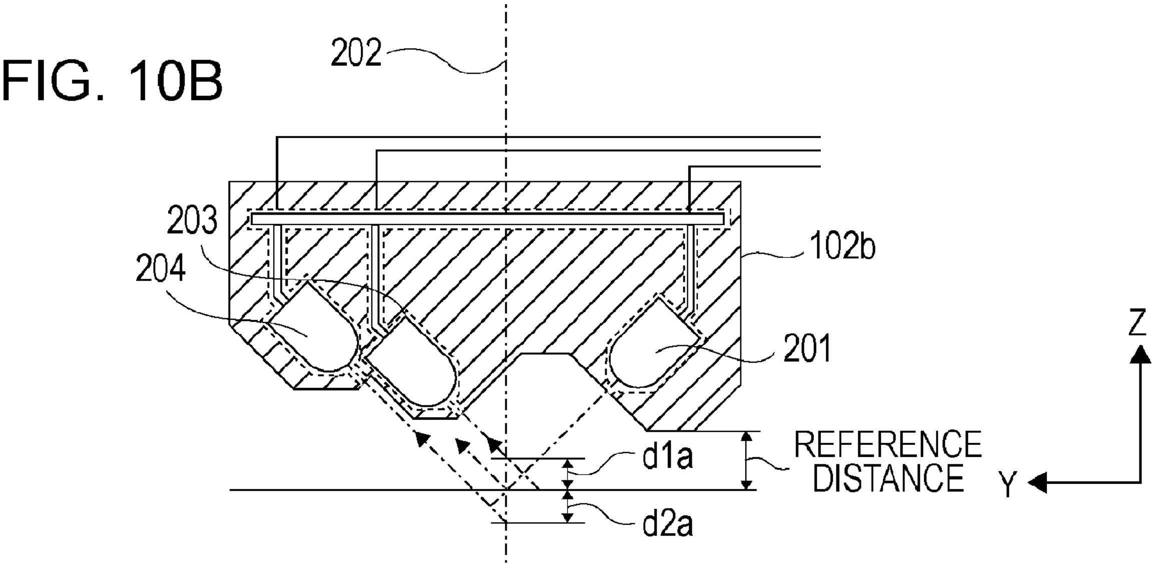

FIGS. 10A to 10E show the configuration of a multipurpose sensor 102*b* according to the second exemplary embodiment in which a light-emitting element 201 and light-receiving elements 203 and 204 are arranged on the same line extending in the Y-direction. FIG. 10A is a plan view, and FIG. 10B is a side view.

As shown in FIG. 10B, in the multipurpose sensor 102*b*, a plurality of light-receiving elements are also arranged so that the light-receiving axes thereof are parallel, in a manner similar to that in the first exemplary embodiment. Since the light-emitting element 201 and the light-receiving elements 203 and 204 are placed on the same line extending in the Y-direction in the multipurpose sensor 102*b*, the light axis of light emitted from the light-emitting element 201 crosses the light-receiving axes of the light-receiving elements 203 and 204. However, the intersection of the light axis of light emitted from the light-emitting element 201 and the reference surface does not coincide with the intersection of the light-receiving axes of the light-receiving elements 203 and 204 and the reference surface (e.g., d1*a* and d2*a*). In other words, the center point of a light-emitting region 701*b* on the reference surface in which light is applied from the light-emitting element 201 does not coincide with the center points of light-receiving regions 702*b* and 703*b* on the reference surface in which the light-receiving elements 203 and 204 can receive light, as shown in FIG. 10D.

Figure 10C:
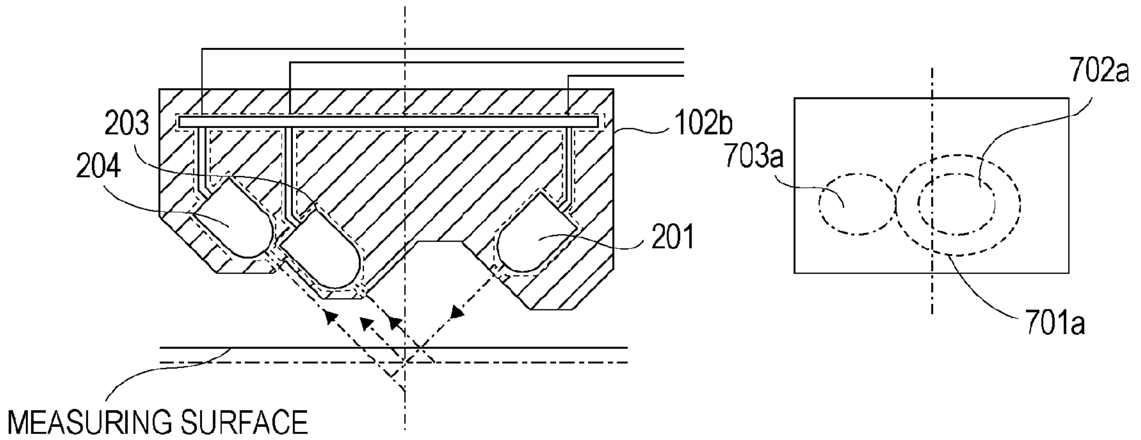
Figure 10D:
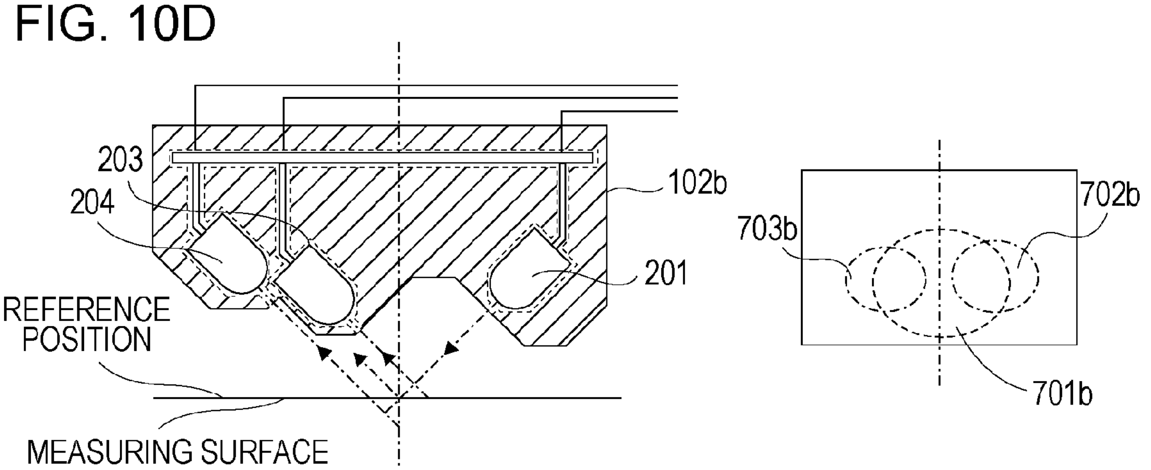
Figure 10E:
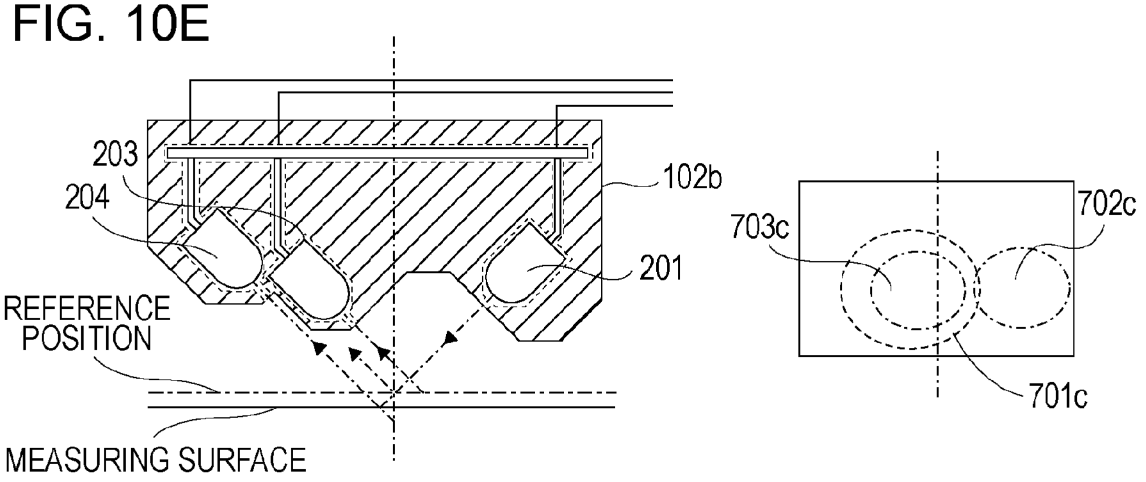

As shown in FIG. 10C, when the measuring surface is shifted (e.g., by −1 mm) from the reference position, the light axis of the light-emitting element 201 crosses the light axis of the light-receiving element 203 on the measuring surface. However, since the light axis of the light-emitting element 201 does not cross the light axis of the light-emitting element 204, output values from the light-receiving elements 203 and 204 are different (e.g., see 701*a*, 702*a*, and 703*a*). In the state shown in FIG. 10E, the light axis of the light-emitting element 201 crosses the light axis of the light-receiving element 204. In this case, the output from the light-receiving element 204 increases as the overlapping area between the light-emitting region 701*c* of the light-emitting element 201 and the light-receiving region 703*c* of the light-receiving element 204 increases. The distances from the centers of the light-receiving regions 702*c* and 703*c* on the measuring surface (intersections of the light axes of the light-receiving elements 203 and 204 and the measuring surface) to the light-receiving elements 203 and 204 are different, and therefore, the outputs from the light-receiving elements 203 and 204 have different characteristics when the measuring surface is shifted in the vertical Z-direction. That is, the overlapping areas between the light-emitting region 701*c* of the light-emitting element 201 and the light-receiving regions 702*c* and 703*c* of the light-receiving elements 203 and 204 change with vertical shift of the measuring surface. Therefore, the amount of vertical shift can be precisely detected by the light-receiving elements 203 and 204 arranged in the manner adopted in the second exemplary embodiment. In particular, as the measuring surface moves away from the sensor, the output from the light-receiving element 204 increases, and the output from the light-receiving element 203 decreases conversely. That is, the outputs from the light-receiving elements 203 and 204 have opposite characteristics.

Since the output values from the light-receiving elements 203 and 204 vary depending on the amount of shift of the measuring surface from the reference position, the distance between the sensor and the measuring surface can be measured. Since the light-emitting element 201 and the light-receiving elements 203 and 204 are arranged on the same line extending in the Y-direction without being shifted from one another in the X-direction, as shown in FIG. 10A, specular reflected light can be directly received when the measuring surface is placed at the predetermined position. It is also possible to reduce the X-direction size of the sensor.

FIGS. 11A to 11E show the configuration of a multipurpose sensor 102*c* according to a third exemplary embodiment of the present invention. In the third exemplary embodiment, one of the light-receiving elements 203 and 204, that is, the light-receiving element 204 and a light-emitting element 201 are arranged on the same line extending in the Y-direction.

Figure 11A:
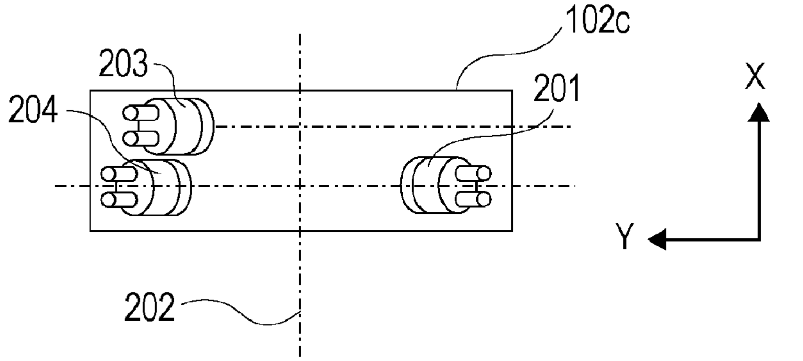
FIGS. 11A to 11E are explanatory views showing changes of a light-emitting region and light-receiving regions depending on the distance between a measuring surface and a sensor according to a third exemplary embodiment of the present invention.
Figure 11B:
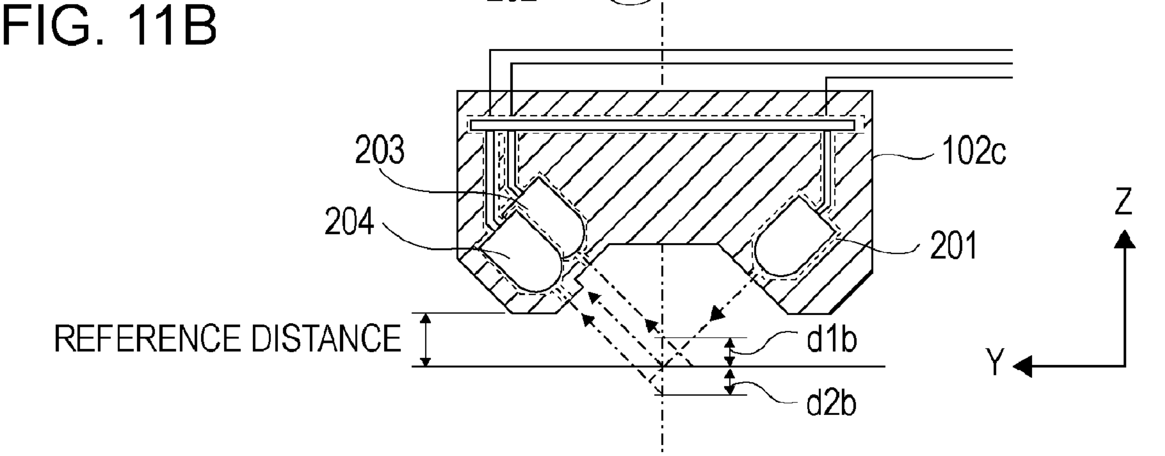
Figure 11C:
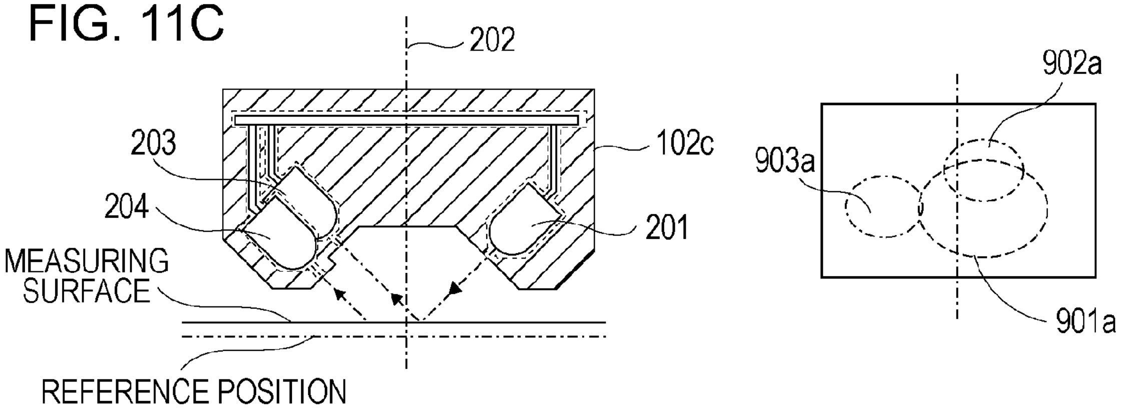
Figure 11D:
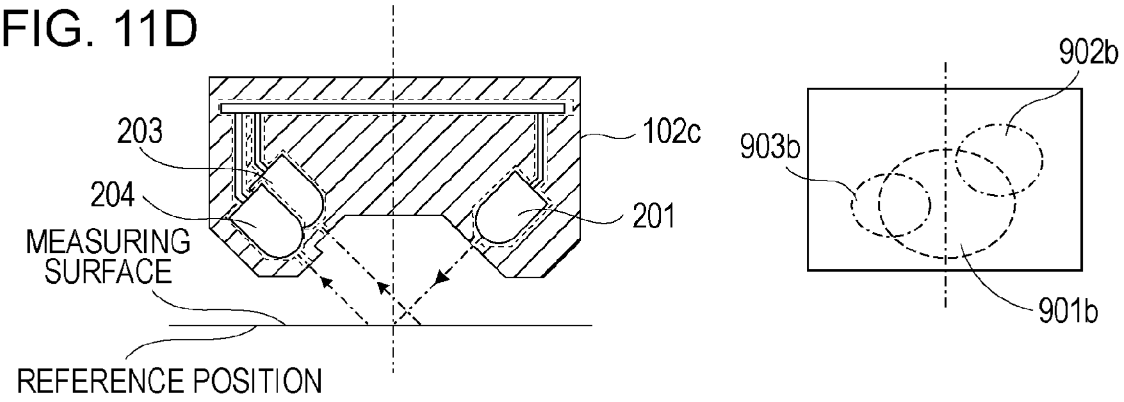
Figure 11E:
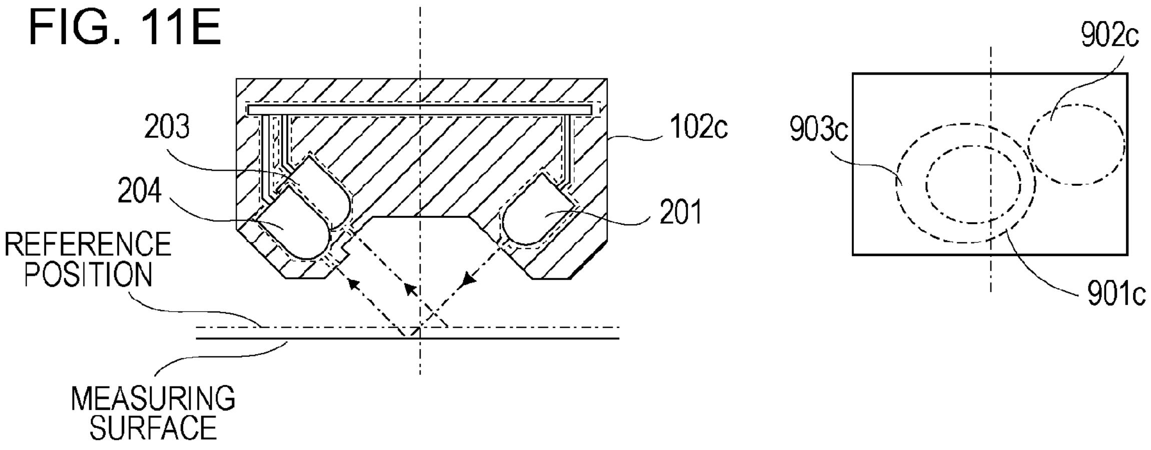

In FIGS. 11C to 11E, reference numerals 901*a-c*, 902*a-c*, and 903*a-c* denote a light-emitting region of the infrared LED 201, a light-receiving region of the phototransistor 203, and a light-receiving region of the phototransistor 204, respectively.

In the state shown in FIG. 11E, the light axis of the light-emitting element 201 crosses the light-receiving axis of the light-receiving element 204, and outputs from the light-receiving elements 203 and 204 are determined in accordance with the position of the measuring surface in the vertical Z-direction (e.g., d1*b* and d2*b*). Therefore, the distance between the multipurpose sensor 102*c* and the measuring surface can be measured. The light axis of the light-emitting element 201 does not cross the light axis of the light-receiving element 203, regardless of the position of the measuring surface in the vertical Z-direction.

As described above, since a plurality of light-receiving elements are arranged so that the light axes thereof do not cross each other in the second and third exemplary embodiments, the distance between the multipurpose sensor and the measuring surface can be precisely detected even with inexpensive elements. Further, the outputs from the light-receiving elements vary with the change of the distance between the multipurpose sensor and the measuring surface, and the light-emitting element and the light-receiving elements can be arranged so that the light-receiving elements have different change characteristics. Therefore, the distance can be detected even when the light axis of at least one of the light-receiving elements crosses the light axis of the light-emitting element.

While the multipurpose sensors 102*b-c* shown in FIGS. 10 and 11 detect the specular reflected light component, the position of the light-emitting element can be changed so as to detect a diffuse reflected light component. Another light-emitting element can be added to detect a diffuse reflected light component in addition to the specular reflected light component. While two light-receiving elements are adopted in the above embodiments, the multipurpose sensor can include three or more light-receiving elements.

As described above, according to the exemplary embodiments of the present invention, since the light axes of a plurality of light-receiving elements do not cross one another, outputs from the light-receiving elements are different even when the measuring surface is shifted in the vertical Z-direction. Therefore, the distance between the sensor and the measuring surface can be measured precisely.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-251651 filed Aug. 31, 2005 and No. 2006-211053 filed Aug. 2, 2006, which are hereby incorporated by reference herein in their entirety.

What is claimed is:

1. A sensor comprising:

a first light-emitting element configured to emit light onto a measuring surface that is parallel to an XY plane of an XYZ three-dimensional coordinate system, wherein a light-emitting axis of the first light-emitting element includes a segment of the light-emitting axis that extends from the first light-emitting element to the measuring surface, and wherein at least the segment of the light-emitting axis does not pass through a light-refracting optical element; and a plurality of light-receiving elements configured to receive reflected light from the measuring surface, wherein the plurality of light-receiving elements are disposed such that a light-receiving axis of a first one of the plurality of light-receiving elements is positioned in a first plane that is parallel to a YZ plane of the XYZ three-dimensional coordinate system and a light-receiving axis of a second one of the plurality of light-receiving elements is positioned in a second plane that is parallel to the YZ plane, the second plane displaced from the first plane in an X direction of the XYZ three-dimensional coordinate system, and wherein the light-receiving axis of each of the plurality of light-receiving elements is positioned having a plurality of Y values in the XYZ three-dimensional coordinate system along the length of the light-receiving axis.

2. The sensor according to claim 1, wherein a distance from the first one of the plurality of light-receiving elements to the measuring surface is different than a distance from the second one of the plurality of light-receiving elements to the measuring surface.

3. The sensor according to claim 1, wherein a distance from the first one of the plurality of light-receiving elements to the first light-emitting element is different than a distance from the second one of the plurality of light-receiving elements to the first light-emitting element when the measuring surface is viewed from a direction perpendicular to the measuring surface.

4. The sensor according to claim 1, wherein the light-receiving axis of at least one of the plurality of light-receiving elements does not cross the light-emitting axis.

5. The sensor according to claim 1, wherein the light-receiving axis of at least one of the plurality of light-receiving elements crosses the light-emitting axis when the measuring surface is placed at a predetermined distance from the sensor.

6. The sensor according to claim 1, wherein the plurality of light-receiving axes of the plurality of light-receiving elements do not cross the light-emitting axis, regardless of the distance between the measuring surface and the sensor.

7. The sensor according to claim 1, further comprising:

a second light-emitting element that is configured to emit light onto the measuring surface at an angle different from an angle at which the first light-emitting element is configured to emit light onto the measuring surface, wherein at least one of the plurality of light-receiving elements is configured to receive the light emitted from the second light-emitting element after the light is reflected by the measuring surface, and wherein the plurality of light-receiving elements are configured to receive specular reflected light when the first light-emitting element emits the light, and at least one of the plurality of light-receiving elements is configured to receive diffuse reflected light when the second light-emitting element emits the light.

8. The sensor according to claim 7, wherein one of the first light-emitting element and the second light-emitting element emits visible light, and the other light-emitting element emits invisible light.

9. The sensor according to claim 8, wherein the second light-emitting element includes a plurality of light-emitting elements for emitting visible light.

10. A detecting device comprising:

the sensor according to claim 1; and a distance detecting device configured to detect the distance between the sensor and the measuring surface on the basis of output values from the plurality of light-receiving elements corresponding to the amount of the reflected light.

11. A recording apparatus configured to form an image on a recording medium, the recording apparatus comprising:

the sensor according to claim 1; and a detecting device configured to detect the thickness of the recording medium with the sensor.

12. The recording apparatus according to claim 11, wherein the detecting device further detects at least one of, the type and end of the recording medium, and the density of the image formed on the recording medium.

13. A sensor comprising:

a light-emitting element configured to emit light onto a measuring surface that is parallel to an XY plane of an XYZ three-dimensional coordinate system;

a first light-receiving element configured to receive light emitted from the light-emitting element and reflected from the measuring surface; and a second light-receiving element configured to receive light emitted from the light-emitting element and reflected from the measuring surface, wherein the light-emitting element, the first light-receiving element and the second light-receiving element are disposed such that a magnitude relation between a distance from a first intersection where a light-emitting axis of the light-emitting element and the measuring surface intersect to a second intersection where a light-receiving axis of the first light-receiving element and the measuring surface intersect and a distance from the first intersection to a third intersection where a light-receiving axis of the second light-receiving element and the measuring surface intersect changes, in accordance with a change in a position of the measuring surface in a direction perpendicular to the measuring surface, and wherein the light-emitting element, the first light-receiving element and the second light-receiving element are disposed such that the light-emitting axis is positioned in a first plane that is parallel to a YZ plane of the XYZ three-dimensional coordinate system and at least one of the light-receiving axis of the first light-receiving element and the light-receiving axis of the second light-receiving element is positioned in a second plane that is parallel to the YZ plane, the second plane displaced from the first plane in an X direction of the XYZ three-dimensional coordinate system.

14. The sensor according to claim 1, wherein the first light-emitting element is disposed such that the light-emitting axis is positioned in a third plane that is parallel to the YZ plane.

* * * * *